May 8, 1956
J. W. STILES
2,744,610
CONVEYING APPARATUS
Filed May 14, 1953
7 Sheets-Sheet 1
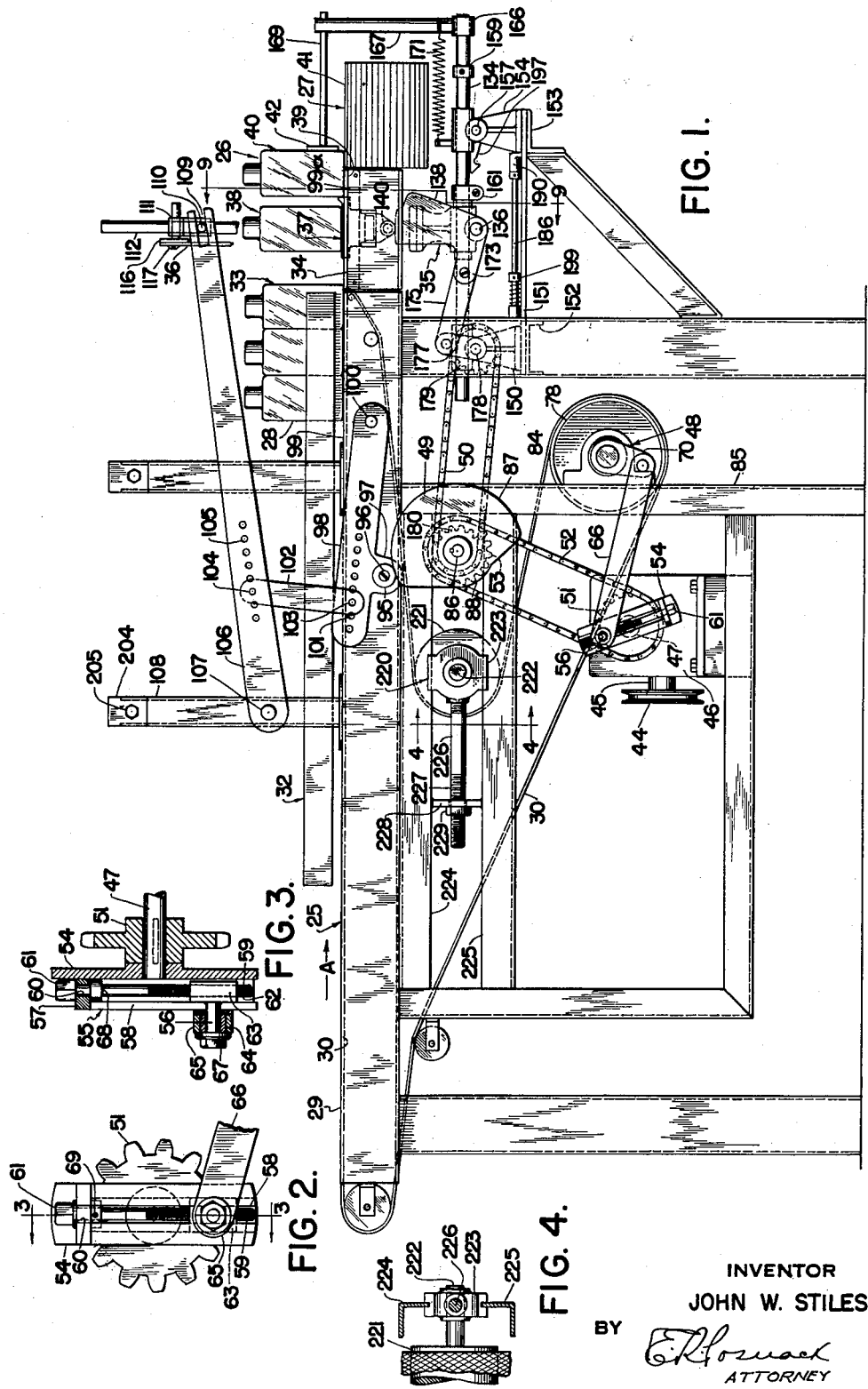
INVENTOR
JOHN W. STILES
BY
*E. R. Cormack*
ATTORNEY May 8, 1956 J. W. STILES 2,744,610
CONVEYING APPARATUS
Filed May 14, 1953 7 Sheets-Sheet 2
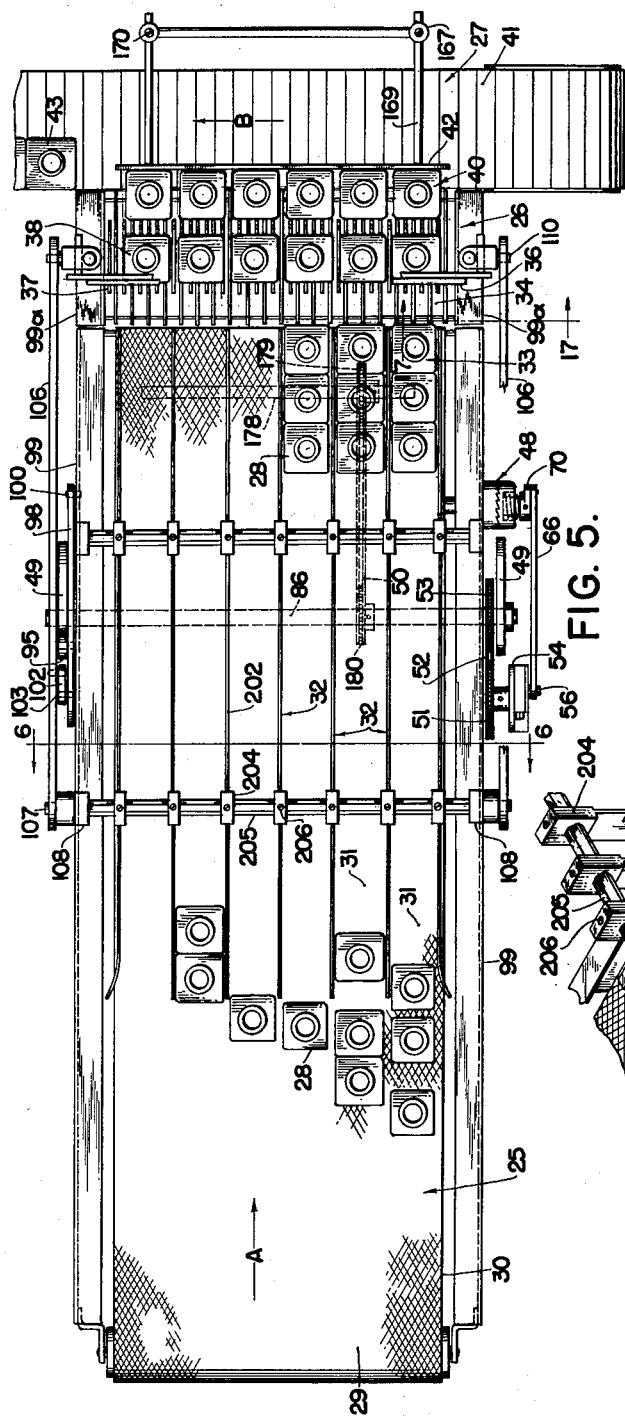
INVENTOR
JOHN W. STILES.
BY
ATTORNEY May 8, 1956  J. W. STILES  2,744,610
CONVEYING APPARATUS
Filed May 14, 1953  7 Sheets-Sheet 3

INVENTOR
JOHN W. STILES.
BY
ATTORNEY

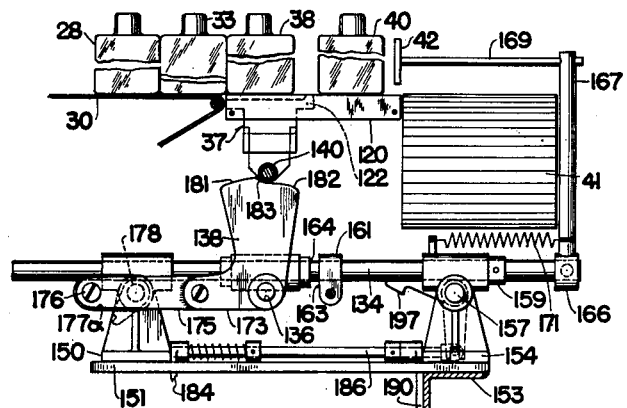
FIG. II.
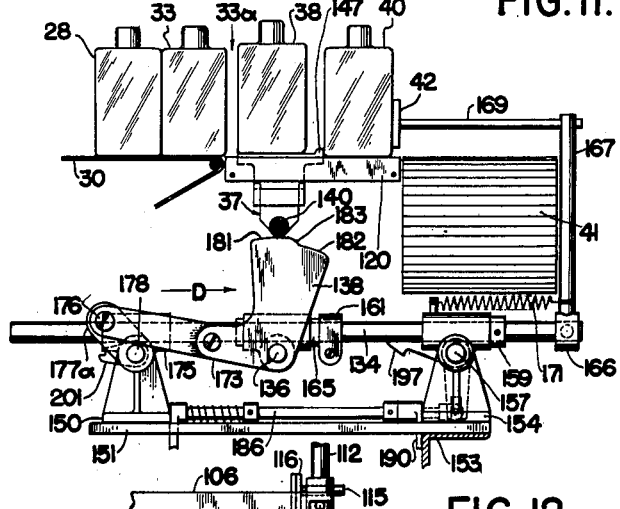
FIG. 12.
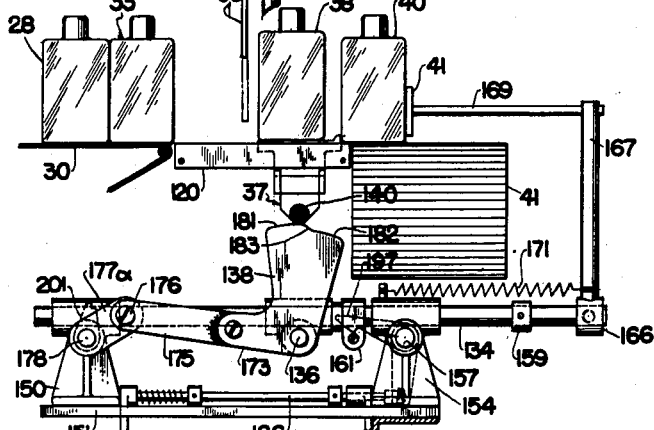
FIG. 13.
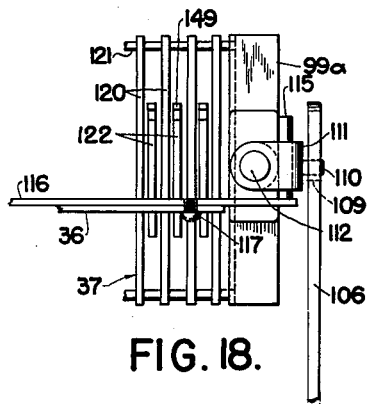
FIG. 18.
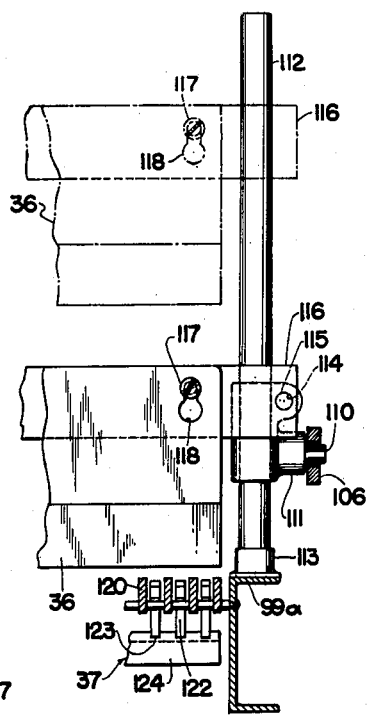
FIG. 17.

May 8, 1956  J. W. STILES  2,744,610
CONVEYING APPARATUS
Filed May 14, 1953  7 Sheets-Sheet 5
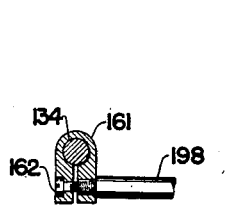
FIG. 16a.
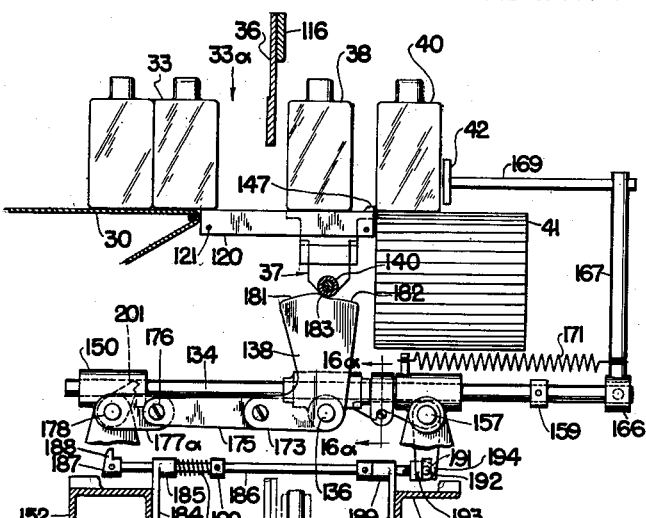
FIG. 14.
FIG. 15.
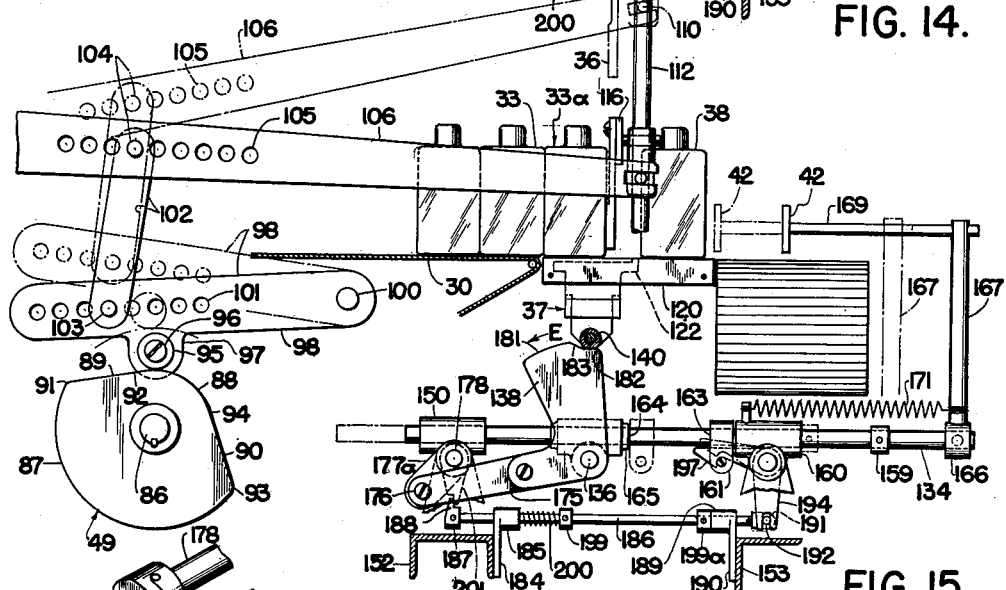
FIG. 16.
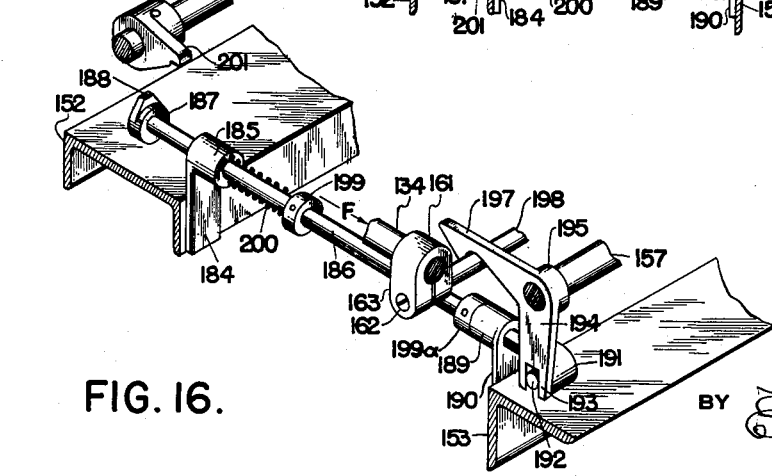
INVENTOR
JOHN W. STILES
BY
ATTORNEY May 8, 1956 J. W. STILES 2,744,610
CONVEYING APPARATUS
Filed May 14, 1953 7 Sheets-Sheet 6

INVENTOR
JOHN W. STILES.
BY
ATTORNEY

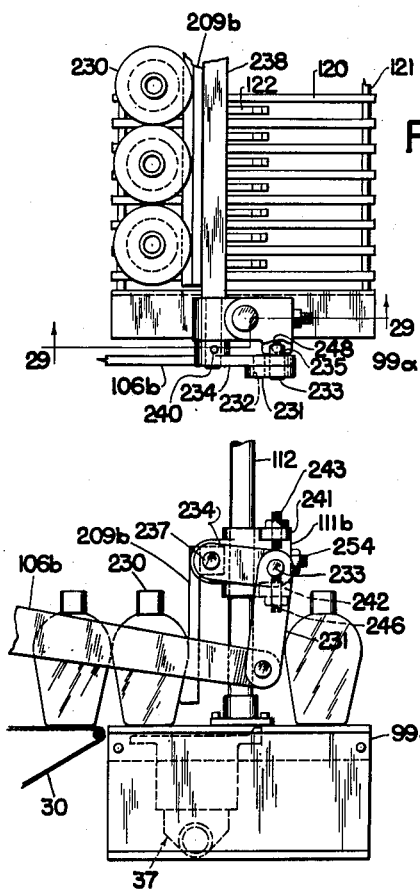
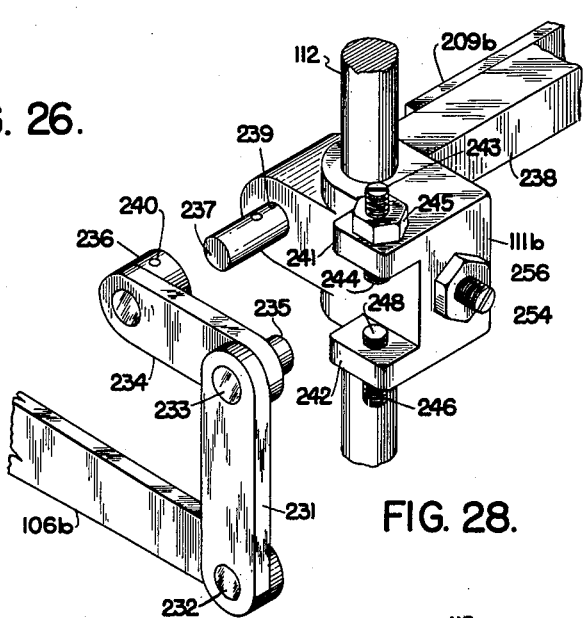
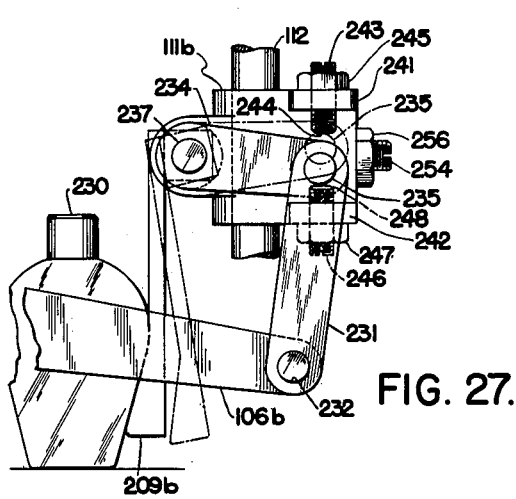
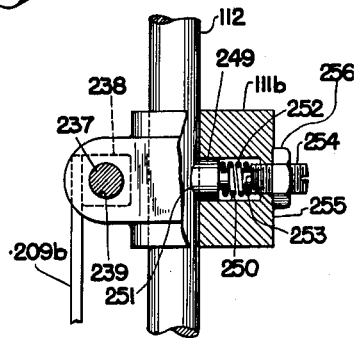

United States Patent Office 2,744,610
Patented May 8, 1956

2,744,610
CONVEYING APPARATUS
John W. Stiles, Miami, Fla.

Application May 14, 1953, Serial No. 355,031

18 Claims. (Cl. 198—32)

This invention relates to conveying apparatus—more particularly to a device for conveying and transferring bottles, containers and the like from a loading and feeding belt to a discharge belt in single line formation. The device is particularly adapted for use in what is commercially known as an unscrambling system.

It is within my contemplation to provide, in an apparatus of the class above-described, a transfer device adapted to receive successive rows of conveyed units from the end of a feeding conveyor, for transfer to a discharge conveyor—so as to take advantage of the greater feeding capacity characteristic of end discharge conveyors in which the conveyed units are discharged in rows, in contradistinction to side discharge devices from which successive units are generally singly discharged.

In the above-mentioned aspect of my invention, it is an important object to enable the said transfer device to accomplish its function with a minimum of motion and steps, so as to expedite the transferring process. In the accomplishment of this objective, I provide a novel transfer mechanism which simultaneously performs two operations, to wit, transferring a row of units from an entrance position on the device to an exit position, and pushing a previously transferred row of units disposed in said exit position onto an adjacent discharge belt, the arrangement being such that the said two rows of units are separate and independent of each other.

It is also within my contemplation to enable the said apparatus to be adapted for bottles, containers and other conveyed units of different sizes, proportions and shapes, including recessed, odd-shaped and normally unstable bottles. And in this aspect of my invention it is my objective to maintain the conveyed units, regardless of their shapes, in proper upright positions from the feeding belt to the final discharge belt, to hold the units against tipping over, and to direct them in proper single-line formation for travel on the discharge belt. In the accomplishment of this aspect of my invention, I provide a novel arrangement of stopping and backing members which, while they serve to cooperate in permitting the feeding and alignment of one row of units at a time, are also retractable to inoperative positions to permit the advance of succeeding rows during the cycle of operation, the arrangement being so adjustable as to be adapted to engage, as well as to clear, conveyed units of various heights and shapes.

It is also an object of my invention to provide guiding means on the feed belt so as to produce a plurality of parallel lanes for advancing units, so arranged that there will be no danger of the units in one lane engaging those on another lane, thereby enabling the most advanced units to proceed forwardly in predetermined line formation. And in this aspect of my invention it is an objective to enable said lanes to be adjusted so as to accommodate units of different proportions.

It is my further object to provide an efficient and economical unit, that is structurally sound and effective in operation, capable of attaining the objectives hereinabove mentioned.

Other objects, features and advantages will appear from the drawings and the description hereinafter given.

Referring to the drawings,

Figure 1 is a front, semi-schematic elevation of an apparatus embodying the essential features of my invention, portions being removed for clarity, the device being shown in the position wherein a plurality of rows of bottles disposed on the feed belt are advancing towards the transfer mechanism, an intermediate row of bottles being shown disposed on the moving portion of the transfer mechanism as it is moving towards the discharge belt, a most advanced row of bottles being shown in the process of being transferred from the stationary portion of the transfer mechanism to the discharge belt.

Figure 2 is a fragmentary front view of that portion of the mechanism shown in Figure 1 comprising the adjustable eccentric drive for imparting an intermittent movement to the feed belt.

Figure 3 is a fragmentary section of Figure 2 taken along line 3—3.

Figure 4 is a fragmentary section of Figure 1 taken along line 4—4.

Figure 5 is a plan view of the apparatus of Figure 1, showing several rows of bottles in the process of being transferred to the discharge belt, the last of a previously discharged row of bottles being shown in an advanced position on said discharge belt, parts being removed for clarity.

Figure 6 is a fragmentary transverse perspective view, looking substantially in the direction of line 6—6 of Figure 5, showing the lane dividers in operative relation to the feed belt.

Figure 7 is a fragmentary perspective view of the vertically movable stop bar and supporting mechanism shown at the upper right-hand portion of Figure 1.

Figure 11 is a semi-diagrammatic front view of the right side of the feeding belt, the transfer mechanism and the discharge belt of Figure 1, showing the movable part of the transfer apparatus in a position about to engage a row of bottles on the entrance side of the mechanism, other parts and bottles being shown in their relative operative positions.

Figure 12 is a view like Figure 11, showing a position beyond that of Figure 11 with the said movable part of the transfer mechanism in the process of transferring a row of bottles from the initial entrance position towards the exit position, and also showing the said movable part of the transfer mechanism in engagement with a row of bottles positioned on the exit platform of the transfer mechanism and operatively engaged by the backing member.

Figure 13 is another view like 12 but showing the parts in a still further advanced position, the foremost row of bottles being shown almost entirely on the discharge belt, and the stop bar being shown operatively in back of the intermediate row of bottles being moved to the exit portion of the transfer mechanism.

Figure 14 is a view like Figure 13, but showing the most advanced row of bottles in their final deposited position on the discharge belt, the movable part of the transfer mechanism being substantially at the end of the advance stroke.

Figure 15 is a view incorporating the mechanism of Figure 14, but showing the movable portion of the transfer mechanism in a retracted position in preparation for the beginning of a new cycle starting at the position shown in Figure 11, the cam mechanism for operating the stop bar being shown at the lowered position of said bar, the dot-dash lines showing the stop bar and associated mechanism in a raised position when the actuating cam has reached a further advanced position.

Figure 16 is a fragmentary perspective view of the holding and tripping mechanism for the backing member and rocker-cam device engageable with the moving portion of the transfer mechanism, this view representing the elements shown at the lower portion of Figure 15.

Figure 16a is a fragmentary section of Figure 14 taken substantially along line 16a—16a.

Figure 17 is a fragmentary transverse view of the apparatus, taken substantially along line 17—17 of Figure 5, showing fragments of the stop bar and supporting mechanism therefor in relation to the transfer device, the dot-dash lines showing the stop plate in an operatively raised position.

Figure 18 is a fragmentary plan view of Figure 17.

Figure 19:
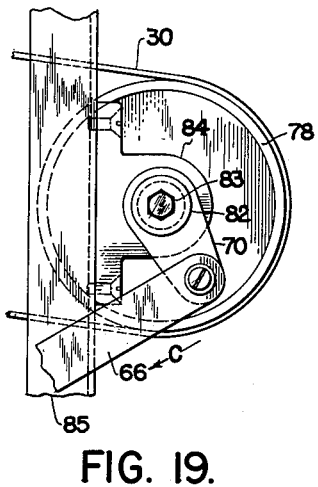

Figure 19 is a fragmentary front elevational view of the drum for intermittently driving the feed belt as illustrated in Figure 1.

Figure 20:
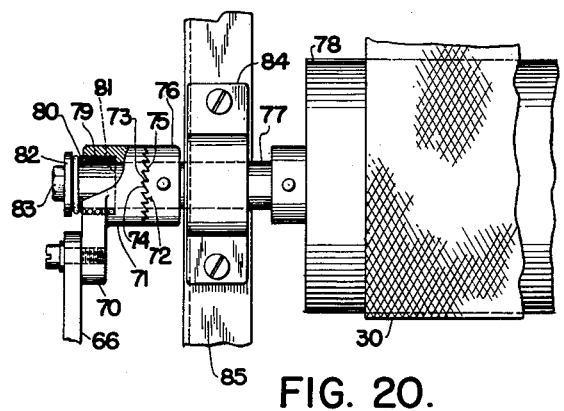

Figure 20 is a fragmentary side view of Figure 19, showing a fragment of the belt operatively around the drum, and illustrating a clutch mechanism for the intermittent drive thereof.

Figure 21:
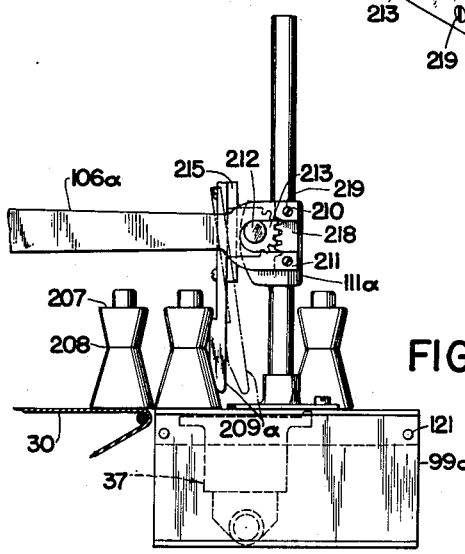

Figure 21 is a fragmentary front elevational view of the end of the feed belt and the transfer mechanism, showing a number of double conical bottles operatively in place, illustrating a modified form of stop bar in engagement with one of said bottles, the dot-dash lines showing the retracted position of said stop bar.

Figure 22:
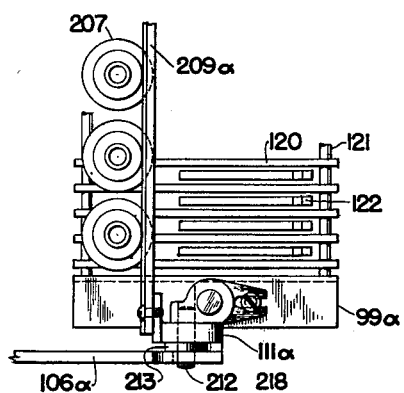

Figure 22 is a plan view of a portion of the device of Figure 21, some of the bottles being removed for clarity.

Figure 23:
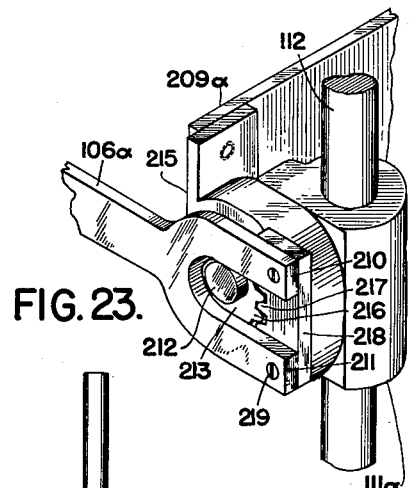

Figure 23 is a fragmentary perspective view of the operating mechanism for the stop bar shown in Figures 21 and 22.

Figure 24:
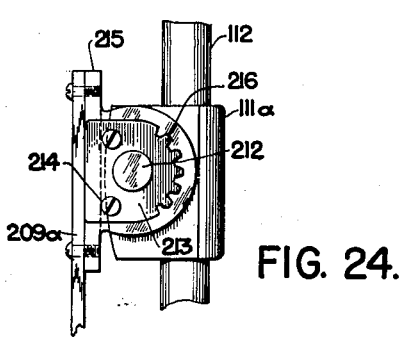

Figure 24 is a side view of the device of Figure 23, with the actuating bar removed.

Figure 25 is a fragmentary front elevational view of of the end of the feed belt and the transfer mechanism, showing a number of specially shaped bottles operatively in place, illustrating another modified form of stop bar construction in engagement with one row of said bottles.

Figure 26 is a plan view of a portion of the device of Figure 25, fragments being removed for clarity.

Figure 27 is an enlarged fragmentary view of Figure 25, showing the stop bar and associated parts in two limiting positions, the full lines showing the stop bar in contacting engagement with a row of bottles, and the dot-dash lines showing the parts in a retracted position.

Figure 28 is a fragmentary exploded perspective view of the form of stop bar mechanism of Figures 25 to 27.

Figure 29 is a fragmentary section of Figure 26 taken substantially along line 29—29, a portion being broken away and other parts being shown in elevation.

In the apparatus illustrated, there are three conveying sections, the feeding section generally designated 25, the transfer section generally designated 26, and the discharge section generally designated 27. The units conveyed, which are illustrated as bottles 28, are deposited by means well known in the art upon the loading portion 29 of feed belt 30 (Figs. 1 and 4) which moves, by intermittent motion, in the direction of arrow A towards the transfer section 26, the bottles being separated into lanes 31 formed by the adjustable separating partitions 32, to be later described. As will hereinafter appear, the most advanced bottles are engaged by a stop bar over the transfer section, temporarily preventing further advance thereof, thereby causing an accumulation of bottles being advanced by the feed belt, in this manner filling up the forward portions of the lanes with parallel rows of contacting bottles.

During the operative movement of the feed belt 30, the most advanced bottle row 33 is moved forwardly upon the stationary entrance portion 34 of the transfer apparatus generally designated 35, the position of the row of bottles on entrance portion 34 being designated as 33a (see Figure 15). At this point the transverse stop bar 36 is interposed in the path of the bottles in position 33a, preventing any further advance thereof, as aforesaid. During the movement of said advanced row of bottles onto the said entrance portion 34 of the transfer apparatus 35, the movable transfer platform 37, supporting a more advanced row of bottles 38, is operatively moving away from said entrance portion 34 towards a stationary exit portion 39 of said transfer apparatus 35, at the same time pushing the most advanced row of bottles 40 onto the discharge conveyor 41 in discharge section 37, a backing member 42 engaging the front portion of the bottles 40 to prevent them from tipping over. This movement continues until the said movable transfer platform 37 has moved forwardly to its extreme right-hand position of Figure 14, the backing member 42 correspondingly moving forwardly to maintain contact with bottles 40. The movable platform 37, which during this forward transferring movement had been slightly elevated (in a manner to be later explained), is now lowered so that it will be out of engagement with the row of bottles 38 carried thereby, in this manner leaving said row 38 standing upon the exit portion 39 of the transfer apparatus 35 (to replace the row of bottles 40), substantially in the position indicated in Figure 14. Thereafter the movable platform 37 is brought back to its initial position at the entrance portion 34, in underlying relation with the bottles in said position 33a (it being shown approaching this position in Fig. 15). The movable platform 37 is then slightly elevated to its operative position whereupon it engages the bottles in said position 33a (Fig. 12), whereafter the platform 37 is operatively moved towards the discharge belt 41 in the manner aforesaid.

As will be seen from Figure 5, the movement of the discharge belt 41 in the direction of arrow B will convey a row of previously deposited bottles to a final discharge position, not shown, two bottles of a previously transferred row 43 being shown in the upper right-hand corner of Figure 5. It should be observed that the platform 37 makes one forward and one return movement, the platform being lowered to a predetermined level during its return movement so that it will be out of engagement with any overlying bottles, and being raised during its advancing movement to a level where it will engage a row of bottles for transfer thereof to the stationary exit portion 39 of the transfer device. The manner in which the above-mentioned parts are operated, and how their movements are coactively timed, will appear from the description hereinafter given.

The apparatus is so designed that it will operate from a single source of power, connected to the pulley 44 (Fig. 1), the latter being operatively associated through shaft 45 with the gear reduction box 46 which is connected to transverse shaft 47, to cause it to revolve, in known manner, at a predetermined speed. Said shaft operates, in a manner to be described, the following: the intermittent clutch drive 48 for the said feed belt 30, the two oppositely disposed cams 49 for operating the aforesaid stop bar 36, and the chain drive 50 for operating the above-mentioned transfer mechanism 35 and backing member 42.

Mounted on shaft 47 is the sprocket wheel 51 in operative engagement with the chain 52 engaging the cam sprocket wheel 53. Fixedly secured to shaft 47, adjacent the sprocket wheel 51, is the plate 54 to which is attached the slotted eccentric bar 55 which supports the pivot 56, at a selectively adjusted position, eccentrically with respect to shaft 47. More specifically, the said bar 55 is disposed diametrically across plate 54 and contains the end wall 57 and diametral slotted portion 58, bolt 59 extending through aperture 60 in wall 57, the head 61 of the bolt being in engagement with the outer surface of said wall 57. Mounted over the threaded portion 62 of the bolt is the nut 63, the shank 56 constituting the pivot hereinabove referred to, said shank 56 extending through slotted portion 58 and having mounted thereover the bushing 64 and the terminal portion 65 of the rocker arm 66, nut 67 being operatively mounted over the terminal end of shank 56. A collar 68 is mounted over the shank of the bolt 59 and in engagement with the inner surface of said wall 57, and being maintained fixed thereagainst by the set screw 69. To adjust the position of pivot 56 with respect to the center of shaft 47, the nut 67 is loosened, whereafter the head 61 of bolt 59 is rotatably manipulated, thereby causing a movement of nut 63 along the threaded portion 62 of the bolt—either to or away from the center of shaft 47, depending upon the direction of rotation of the bolt 59—in this manner causing corresponding movements of pivot 56.

In view of the eccentric arrangement of said pivot 56 it is apparent that upon an operative rotation of shaft 47, the arm 66 will be caused to rock between two limiting positions, depending upon the position of said pivot 56, thereby imparting a corresponding rocking movement to the bell-crank 70. As will be seen from Figures 19 and 20, said bell-crank 70 contains the hub 71 with an arrangement of teeth 72 at one terminal thereof, each tooth consisting of a wall 73 substantially parallel to the axis of the bell-crank, and an inclined wall 74, said teeth 72 being in operative engagement with a correspondingly arranged set of teeth 75 on the collar 76 fixedly mounted on shaft 77, the latter carrying the drum 78 which carries the said feed belt 30. The bell-crank has a cavity 79 within which is disposed a helical spring 80 abutting the wall 81 of the cavity and in engagement with the washer 82 abutting the terminal nut 83. The said shaft 77 is operatively supported by the bearing bracket 84 secured to the angle-bar post 85 constituting part of the structural support for the apparatus.

When arm 66 is operatively moved in the direction of arrow C (Fig. 19), it will cause a clockwise rotation of the bell-crank 70 whereupon the teeth 72 will engage the teeth 75 and cause a corresponding rotation of shaft 77, said coacting teeth being held in engagement with each other by the action of said spring 80. Such movement of shaft 77 causes a corresponding movement of drum 78, and consequently a movement of the feeding belt 30 in the direction of arrow A. When the said rocker arm 66 is operatively moved in a return direction (substantially opposite that of arrow C), the sloping walls of the teeth 72 and 75 will slide over each other, whereupon the shaft 77, drum 78 and belt 30 are maintained in stationary condition.

It is thus apparent that the extent of each intermittent conveying movement of belt 30 can be regulated by operatively adjusting the eccentric position of said pivot 56.

It is to be noted that the rocker arm 66 is operated into its return (not actuating) movement when the said transfer platform 37 is disposed at the entrance portion 34 of the transfer apparatus, so that there is no movement of the belt 30 while said transfer platform 37 is being raised to engage a row of bottles in position 33a at the said entrance portion; neither is there any movement of the belt while the said transfer platform 37 is in an intermediate position (such as is shown in Figure 1) during its advancing movement. The operative forward movement of the feed belt 30, in the direction of arrow A, occurs mainly upon the return movement of transfer platform 37, beginning approximately in the position of the said platform illustrated in Figure 14 and continuing until the transfer platform is substantially in the position illustrated in Figure 15.

As aforesaid, there are two stop-bar actuating cams 49 mounted at opposite ends of the transverse shaft 86, this shaft being driven by the chain 52 mounted over the sprocket wheels 51 and 53. Each of said cams 49 has an outer arcuate surface 87 (see Fig. 15), and an inner arcuate surface 88, said arcuate surfaces being connected by sloping surfaces 89 and 90 at points 91 and 92, 93 and 94, respectively. In operative engagement with the outer periphery of each of cams 49 is the roller 95 rotatably mounted, in known manner, over the stud 96 secured to the extension 97 of the follower arm 98, the latter being pivotally mounted on the channel bar 99 (constituting the frame of the feeding section) at pivotal point 100. Each of said arms 98 has a plurality of apertures 101 therein, the connecting link 102 having a pin 103 in operative pivotal engagement, in known manner, with a selected one of said apertures. The opposite end of each of said connecting links 102 has a pin 104 pivotally connected to a selected one of the apertures 105 in a lever 106 pivotally mounted at 107 on the upright member 108. Each of said levers 106 has at its forward end an open slotted portion 109 slidably and rotatably engageable with a pin 110 integral with a bracket 111 (Figs. 1 and 7), said pin extending through said slotted portion 109, the bracket being slidably mounted over post 112. The posts 112 are mounted within the respective receptacles 113 supported at the short channel members 99a flanking the transfer member 37 (see Figs. 17 and 18).

Extending through aperture 114 in each of said brackets 111 is a rod 115 the rear end of which is connected to and carries the transverse supporting bar 116, said bar supporting the said stop bar 36. In the particular embodiment illustrated, the said supporting bar 116 carries, at opposite ends thereof, the fasteners 117, the stop bar 116 having keyhole slots 118 adapted to permit the ready attachment and removal of the stop bar upon supporting bar 116, the expanded portion of said keyhole slots being proportioned to fit over the heads of fasteners 117, whereafter the stop bar is slid down the shanks of the fasteners in known manner.

Each of said brackets 111 is further provided with a set screw 119 the inner terminal of which is adapted to engage the rod 115, thereby to hold it, and hence the stop bar 36, in a predetermined position relative to post 112 and the said transfer apparatus. It is apparent that with the stop bar arrangement described, stop bars of various proportions and shapes can be selectively employed, depending upon the shape and proportions of the units being conveyed. It is furthermore to be noted that the arrangement of apertures 101 and 105 on the cam follower 98 and lever 106, respectively, is such as to permit adjustments of the vertical stroke of lever 106, and hence of the brackets 111 and the stop bar carried thereby. It is thus evident that the position of the stop bar 36 can be varied both as to distance above the transfer mechanism 35, and as to distance from the entrance portion 34 of the transfer device, thereby to accommodate the apparatus for use with bottles of different heights and proportions.

Figure 10:
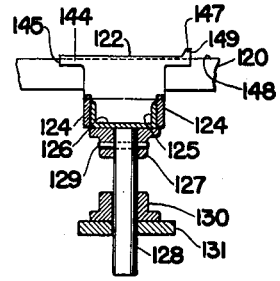
Figure 10 is a fragmentary section of Figure 9 taken substantially along line 10—10.
Figure 8:
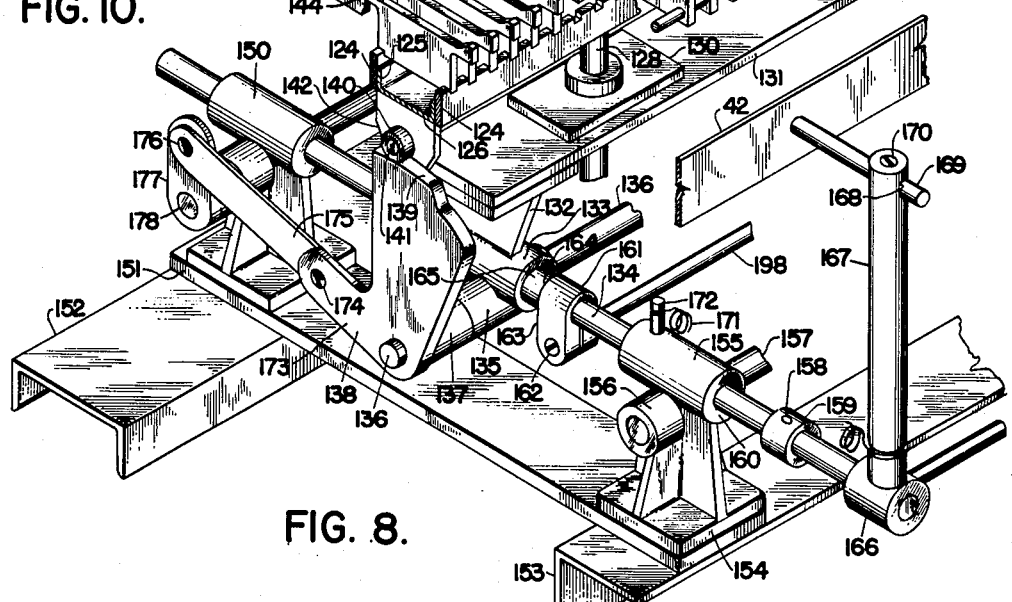
Figure 8 is a fragmentary somewhat enlarged perspective view of the transfer device and actuating mechanism therefor, including the backing member operatively associated therewith, the fragment shown being substantially below the device of Figure 7.
Figure 9:
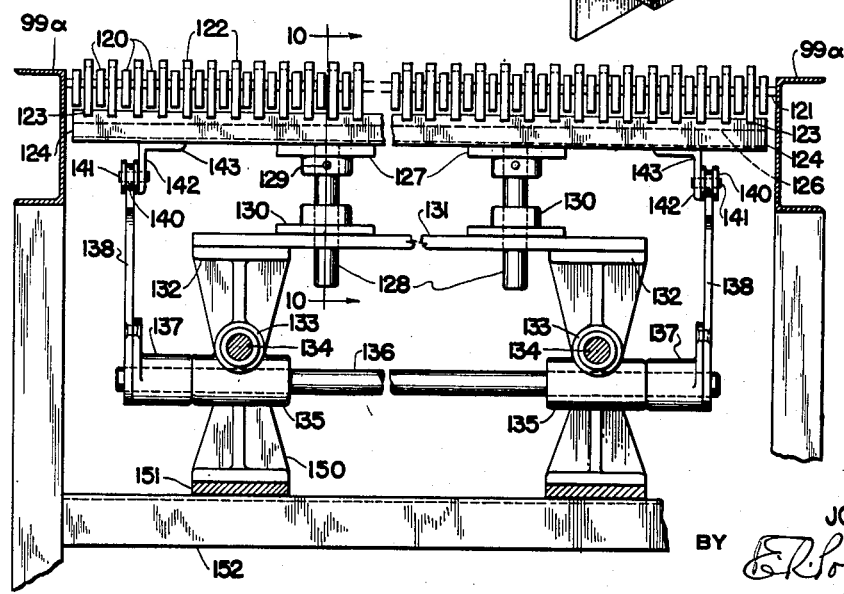
Figure 9 is a fragmentary transverse section of the transfer mechanism of Figure 8, this section being taken substantially along 9—9 of Figure 1, fragments being removed for clarity.

The construction of the transfer apparatus can clearly be visualized from Figures 8, 9 and 10, in addition to certain other figures which will hereinafter be referred to. It will be observed that the said transfer device comprises a plurality of stationary longitudinally disposed spaced parallel bars 120, these being connected together and maintained in spaced relation by the transverse rods 121. The said bar structure constitutes the stationary portion of the transfer device, the rear portion having previously been designated as entrance portion 34 and the forward portion as the exit portion 39.

The movable transfer portion 37 consists of a plurality of parallel bars 122 disposed between and parallel to said bars 120 and movable between said entrance and exit portions, and between upper and lower levels, as hereinabove indicated. The arrangement is hence such that the stationary portions 34 and 39 serve, respectively, as receiving and discharge grids, and the movable portion 37 as a transfer grid.

The said bars 122 of the transfer grid are supported within recessed portions 123 of the parallel upright plates 124, these being adjacent the upright arms 125 of the angle bar 126, the plates 124 and angle bar 126 being disposed upon the two centrally apertured mountings 127 through which extend the guide posts 128, the taper pin 129 maintaining said posts in fixed relation to mountings 127 and the structure thereabove. The said posts 128 slidably extend through two lower, correspondingly positioned apertured mountings 130 which are mounted upon the transverse base 131 supported by the opposite brackets 132, the latter containing bearings 133 slidably supporting the two backing member shafts 134. Preferably integral with brackets 132 are the respective lower bearing brackets 135 supporting the two transverse transfer-cam shafts 136, opposite terminal portions of said shafts extending through the inner bosses 137 affixed to the opposite transfer cams 138. The upper surface 139 of each of cams 138 is in supporting underlying engagement with the roller 140 rotatably mounted on pin 141 fixedly attached to vertical arm 142 of angle bar 143. As will more clearly hereinafter appear, the position of said transfer grid 37, through every portion of its operative and return movements, is determined by the position of said cams 138, since the said transfer grid structure operatively rests upon said cams 138 and is connected, by said guide posts 128, with said base 131 which, through said brackets 132, is associated and movable with shafts 136 upon which said cams 138 are mounted.

The said transfer grid bars 122 have rearwardly disposed extensions 144, the rear extremeties 145 of which are adapted to be in substantially transverse alignment with the rearmost edges 146 of the stationary bars 120 when the transfer grid is in its maximum retracted position. The said movable grid bars 122 have forward extensions or lips 147, these being elevated above the upper edges 148 of the stationary bars 120, thereby presenting front walls 149 which are in transverse alignment and adapted to serve as push walls for engagement with bottles on the exit portion of the transfer apparatus, as clearly indicated in Figures 1, 12, 13 and 14.

The rear portion of each of said shafts 134 is slidably supported by bearing bracket 150 which is supported upon the base plate 151 resting upon channel member 152 and angle bar 153, the latter supporting brackets 154 each of which contains a forward bearing 155 for supporting said shaft 134 and a bearing 156 for supporting a front transverse shaft 157. Affixed by set screw 158 to shaft 134 is the collar 159, this being abuttable with the forward end 160 of the bearing 155 when the shaft 134 is operatively retracted in a manner to be hereinafter described. Also mounted on shaft 134 behind bearing 155 is the clamp 161, releasively held in frictional engagement with said shaft by the set screw 162, the rear surface 163 of said clamp being engageable with the front surface 164 of the hub 165 integral with bearing 133, when shaft 134 is operatively projected into a forward position, such as is illustrated in Figures 13 and 14. The forward end of each of shafts 134 contains a fitting 166 to which is secured vertical post 167 through the upper aperture 168 of each of which extends a rod 169 the rear terminal of which carries the backing member 42.

The set screw 170 at the top of each post is abuttable with rod 169, in known manner, thereby adjustably holding rods 169 and backing member 42 in a selected position relative to the transfer apparatus. Anchored to each of posts 167 is a spring 171, the rear portion of which is secured to spring pin 172 on bearing 155.

Each of the transfer cams 138 contains a rearwardly extending arm 173 pivotally attached at 174 to the link 175, the rear portion of the latter being pivotally attached at 176 to the bell-crank 177 fixedly mounted upon rear transverse shaft 178. Affixed to said shaft 178 is the sprocket wheel 179 (Figs. 1 and 4), this being connected by the chain 50 to the sprocket wheel 180 fixedly mounted upon said shaft 86.

The arrangement is hence such that upon an operative rotation of shaft 178, through chain 50 and the drives connected therewith, the bell-cranks 176 will correspondingly rotate, to reciprocatingly actuate the links 175, thereby causing a corresponding reciprocation of each of the cams 138 and the entire transfer grid mechanism 37, the contour of the upper cam surface 139 being such as to also cause the aforesaid vertical movements of said transfer grid, as will hereinafter appear.

It will be noted that the said cam surfaces 139 of each of cams 138 consists of a raised portion 181 and a lower portion 182, these portions being essentially arcuate about the center of rotation of the cam and being connected by the intermediate inclined surface 183. The vertical position of the transfer grid is determined by each of the cam surfaces the said followers 141 are in engagement with. The horizontal position of the transfer grid is determined by the position of the bell-crank 177 and associated parts. To follow the movement of the transfer grid, reference will be made to a cycle beginning with Figure 11 and ending with Figure 15.

In Figure 11 the transfer grid 37 is at the rearmost portion of its stroke, with the follower 140 in engagement with intermediate cam surface 183, the grid being in its lowered position. The crank arm 177a is in its extreme rearmost position, in horizontal alignment with link 175 and extension 173 of cam 138. This position determines the extreme retracted position of the said cams 138, the shaft 136 upon which they are mounted and all the other above-mentioned elements associated and employable therewith. As the crank rotates in a clockwise direction (Fig. 12), the cam 138 is also rotated in such direction, and at the same time the entire cam mounting assembly is moved forwardly in the direction of arrow D, since there is no resistance to such movement. The rotation of each cam causes an elevation of roller 140 and a consequent elevation of the transfer grid 137 to elevate the row of bottles 38 and begin their operative transfer forwardly.

Figure 13 shows the crank arm 177a in a further advanced position, with cam 138 and the transfer assembly almost at the extreme end of their operative forward stroke, the grid being still in its raised position since follower 140 is in operative engagement with raised cam surface 181.

Figure 14 shows the crank arm 177a in dead-center with respect to link 175 and extension 173, this determining the maximum forward position of the transfer grid 37. It is at this point that follower 140 is beginning to assume its lowered position, since it is now in engagement with the intermediate cam surface 183. It will be observed that as the crank arm 177a continues its clockwise rotation (see Fig. 15), not only is each cam 138 (and the parts associated therewith) retracted almost to the extreme rearward position of its stroke, but also that the cam has rocked back, in the counter-clockwise direction of arrow E—follower 140 now being on the lower cam surface 182, and the grid 37 being correspondingly lowered in a position preliminary to the beginning of a new cycle, at which it is again to be raised to lift a new row of bottles at position 33a for a transfer operation.

In the manner above-described, every operative rotation of the crank arm 177a causes a complete cycle of movement of the transfer mechanism, to effect a transfer of a row of bottles from the feed belt 30 to the discharge belt 41. During such cycle, the backing member 42 is also automatically actuated so that it will coact properly with the upwardly protruding lips 147 of the transfer mechanism to maintain a row of bottles in place, and so that it will thereafter be retracted from its holding position. This action will be described with reference to Figures 1, 8, 9, and 11 to 16.

In Figure 11 it will be observed that the backing member 42 is in its rearmost or retracted position, over the foremost portion of the transfer apparatus. In this position each of the shafts 134 is in its maximum retracted position with the collar 159 in engagement with surface 160 of bearing 155. As the cams 38 and mountings associated therewith move forwardly, to the position shown in Figure 12, the hub 167 of each of brackets 133 comes into engagement with clamp 161; and since this is frictionally affixed to shaft 134, the continued forward movement of the cam mechanism causes the shafts 134 to move forwardly against the action of springs 171, to correspondingly move forwardly the backing member 42 to the position shown in Figure 13, in which position the said springs 171 are in extended condition.

Figure 14 shows the parts in their maximum advanced position with springs 171 under maximum tension, the lips 147 and backing member 42 both still being in flanking relation with the row of bottles 40. The discharge belt 41 moves at a predetermined rate to convey row of bottles 40 to a point of discharge (not shown), so that the bottles are out of the way of said backing member to leave room for the next row of bottles. It will be observed that while lips 147 are in engagement with bottles 40, the backing member 42 is slightly spaced from the bottles, thereby facilitating the conveying action of discharge belt 41. It has been found that although there is a slidable engagement between the lips 147 and backing member 42 during such movement of the line of bottles 40, there is no impediment whatsoever to the operation of the machine.

In order to move the backing member 42 in coordinated relation with the row of bottles with which it is in engagement, an actuating and release mechanism is employed as illustrated in Figure 16, as well as in Figures 11 to 15.

Mounted upon channel 152 is the bracket 184 which contains the bearing 185 supporting the shaft 186, said shaft extending rearwardly beyond bracket 184, the rear portion of shaft 186 having fixedly mounted thereover a member 187 with an upwardly extending lip 188. Shaft 186 extends forwardly through bearing portion 189 of bracket 190 attached to angle bar 153. The foremost portion of the shaft 186 has mounted thereover a terminal member 191 containing a pin 192 which extends through the bifurcated terminal 193 of the arm 194 of bell-crank member 195, the latter being operatively mounted on transverse pawl shaft 157. Said bell-crank 195 contains a pawl 197 the hooked head of which is adapted for engagement with the transverse shaft 198 connected to clamps 161. Also fixedly mounted upon shaft 186 is the collar 199, the helical spring 200 disposed between collar 199 and bracket bearing 185 exerting a pressure forwardly in the direction of arrow F (Fig. 16). Said spring 200 accordingly is effective in urging said bell-crank 195 to rotate in a counter-clockwise direction (looking in the direction illustrated in Fig. 16), whereby the pawl 197 is urged downwardly for engagement with the said transverse shaft 198. The extreme forward limiting position of shaft 186 is determined by the engagement of collar 199a with bearing 189, as clearly shown in Figure 15.

Mounted on shaft 178 is the tripping finger 201 adapted, upon an operative rotation of shaft 178, to engage said lip 188 to move it rearwardly thereby retracting shaft 186 against the spring 200. Such movement causes a clockwise rotation of the bell-crank 195 and an operative disengagement of the pawl 197 from the transverse shaft 198.

When the pawl 197 is operatively brought into engagement with said transverse shaft 198, as aforesaid, said transverse shaft is obviously held against movement, thereby also holding clamps 161 and the said shafts 134 against rearward movement against the action of said springs 171. When, however, the pawl 197 is operatively released from its engagement with transverse shaft 198, in the manner above described, it will permit the said springs 178 to draw the posts 167 rearwardly from the foremost positions thereof shown in Figure 15 to the dot-dash rearmost positions, thereby causing a corresponding retraction of the backing member 42 from its projected position shown in the full line to the dot-dash position 42.

By referring to Figure 13 it will be observed that the pawl 197 is about to engage the shaft 198. In Figure 14 it is shown in full engagement therewith. Figure 15 shows the tripping finger 201 about to engage the lip 188; and after such engagement, the parts are retracted to the dot-dash position above-mentioned and that shown in Figure 11.

It is accordingly evident that after the transfer mechanism has been brought back to its retracted position, the backing member is also automatically brought back to its retracted position, after it has fully performed its function in its projected position.

By referring to Figures 1, 5 and 6 it will be seen that the partition structure 31 consists of a plurality of partition walls 202 in parallel spaced relation, each of said walls having an upright extension 203 joined to a block 204. Each of said blocks is apertured to receive therethrough the polygonal rod 205 supported by opposite posts 108, the blocks also containing set screws 206 adapted to engage said polygonal rod 205 so as to maintain the blocks and spacing partitions in fixed predetermined relative positions. It is apparent that because of the polygonal structure of the rod and the corresponding holes in the blocks, there can be no rotation of the blocks and extensions 203 with respect to the rod; and it is further evident that the spacing between the various walls can be adjusted by loosening the set screws 206 and slidably adjusting the position of the blocks in accordance with a selected spacing arrangement. The belt 30, moving below the suspended walls 202, is maintained in tension by the conventional tensioning mechanism 220 (Figs. 1 and 4). The drum 221 has mounted thereover a loop of belt 30, shaft 222 extending through slide member 223 recessed at top and bottom to straddle the vertical legs of the angle-bars 224 and 225 for slidable movement therealong. The slide member 223 is connected to the bolt 226 the threaded portion 227 of which extends through the stationary plate 228, a nut 229 being mounted over the bolt 226 and being in engagement with the plate 228. It is apparent that upon a clockwise turning of the nut 229 against plate 228, bolt 226 with its slide member 223 will be adjustably moved rearwardly, to tension the belt 30; and a slackening effect may be obtained by rotating the nut in the opposite direction.

In order to accommodate bottles of special shapes, such as the double conical bottles 207 which contain intermediate recessed portions 208, a special shaped stop bar 209a is employed which can fit against the bottles so as adequately to serve its intended stop function, and which can nevertheless be retracted out of the way when the lever 106a is to be brought upwardly, in the manner aforesaid (see Figures 21 to 24).

In this special construction, the forward terminal of lever 106a contains the two arms 210 and 211, these being spaced apart a distance greater than the diameter of pin 212 extending from the slidable bracket 111a. Rotatably mounted over the pin 212 is the pinion 213 to which is attached, by screws 214, the support 215 for the special-shaped stop bar 209a. The teeth 216 of said stop bar are in engagement with the teeth 217 of the rack 218 attached, by screws 219, to the two arms 210 and 211 at the end of the lever 106a.

When the lever 106a is in the position shown in Figure 21, the stop bar 209a is in proper operative position against the adjacent bottle. When, however, it is desired to move the lever 106a upwardly so as to correspondingly move the stop bar 209a upwardly and out of the way of the bottles, such upward movement, effected by means hereinabove described, will cause a corresponding upward movement of the rack 218 forming a part of the lever. This will cause the spur gear 216, in engagement with said rack, to rotate slightly in a counter-clockwise direction, thereby causing a corresponding arcuate retraction of the stop bar 209a from its full line position to the dot-dash position of Figure 21. In this position the upward movement of the lever 106a will not be interfered with by the bottle, since the overhanging upper portion has been cleared by the stop bar in its retracted position.

Another stop bar modification for accommodating bottles of special shapes, such as bottles 230 shown in Figures 25 and 26, is the structure illustrated in Figures 25 to 29. Pivotally connected to the forward terminal ends of lever 106b, corresponding to levers 106 and 106a hereinabove described, is the link 231, the pivotal connection being effected by the pin 232 at the bottom of the link. The upper portion of the link is pivotally connected to the pin 233 attached to the arm 234, said pin 233 having a protruding extension or actuator 235 whose function will be hereinafter explained. The arm 234 has a hollow terminal hub 236 mounted over rod 237 which is an extension of the support 238 for the special-shaped stop bar 209b. The said rod 237 is rotatably mounted within the aperture 239 in the bracket 111b slidably mounted over the post 112. The set screw 240 fixedly secures the hub 236 to rod 237, so that upon an operative rotation of arm 234, the rod 237, together with support 238 and stop bar 209b, will be correspondingly rotated.

Bracket 111b has two parallel spaced flanges 241 and 242, the former or upper one having an adjusting stud 243 extending therethrough and in threaded engagement therewith, said stud having a lower terminal 244 below flange 241. Mounted over stud 243 and in engagement with flange 241 is the nut 245. The arrangement is such that when the stud 243 is rotatably manipulated, the level of terminal 244 with respect to flange 241 can be varied, the nut 245 being effective to secure the stud 243 in the said adjusted position. The lower flange 242 similarly has a stud 246 extending through and in threaded engagement therewith, the position of said latter stud being adjustable and held in its adjusted position by the nut 247 in the manner aforesaid. The arrangement is hence such that the distance between terminal 248 of stud 246 and terminal 244 of stud 243 can be varied to suit the particular requirements.

In the operation of this modified form of stop structure, the lever 106b is actuated in the manner aforesaid with respect to the forms first above described. When said lever 106b is actuated upwardly, the link 231 will, through its said pivoted connections, rotatably actuate arm 234, to cause a corresponding actuation of stop bar 209b. As will more clearly hereinafter appear, as the lever 106b continues its upward movement the whole bracket 111b will be slidably actuated upwardly, whereby the retracted stop bar 209b will be correspondingly moved upwardly out of the path of the row of bottles 230, an operation which is rendered effective by virtue of the coaction between said extension 235 of pin 233 and the terminals 244 and 248 of the respective studs 243 and 246.

It will be observed that said extension or actuator 235 is positioned between the terminals 244 and 248 of said studs 243 and 246 when the parts are assembled. When the stop bar 209b is in its bottle-engaging position of Figure 27, as shown by the full lines, the said actuator 235 is in engagement with terminal 248 of lower stud 246. During the first part of the upward operative movement of lever 106b, the operative rotation of arm 234 will carry the stop bar 209b to its dot-dash retracted position shown in said Figure 27. At this point the actuator 235 is in engagement with the terminal 244 of the upper stud 243, as indicated by the dot-dash lines. The continued upward movement of lever 106b will now cause said actuator 235 to press against terminal 244, and thereby cause an upward slidable movement of the entire bracket 111b along post 112, to an upper position where it is out of the path of bottles 230, substantially like the dot-dash position of stop bar 36 shown in dot-dash lines in Figure 15. Upon a return downward movement of lever 106b, the action is reversed, causing a return movement of stop-bar 209b to its bottle-engaging position, and upon a continued downward movement of lever 106b, actuator 235 will exert pressure upon terminal 248 of stud 246 to cause an operative downward sliding movement of bracket 111b along post 112, until the stop bar 209b is operatively in the path of on-coming bottles.

In order to assure a retraction of stop 209b during the first part of the upward movement of lever 106b, without any upward sliding movement of the entire bracket 111b, a pressure pad 249 is inserted within recess 250 of bracket 111b, the terminal portion 251 of the pad, which is preferably made of a yieldable substance like rubber, being in engagement with the post 112. The pad 249 is yieldably maintained in engagement with post 112 by the action of spring 252 within the said recess 250, said spring being in engagement with the shoulder 253 of adjusting screw 254 which extends through and is in threaded engagement with wall 255 of bracket 111b. Mounted over said screw 254 is the nut 256. The arrangement is hence such that the pressure of pad 249 against the post 112 can be adjustably regulated by operatively rotating screw 254 to vary the tension of spring 252, the nut 256 holding the parts in said adjusted position.

It is thus apparent that the operative movement of lever 106b causes a retraction of the special shaped stop bar 209b to a position where it will be free to move upwardly out of the path of the on-coming bottles, to enable the required bottle-transferring operation to be effectuated in the manner above-described. By operatively manipulating the studs 243 and 246, the distance through which stop bar 209b is retracted can be regulated, depending upon the proportions of the bottles; and further regulation of the frictional engagement between the bracket 111b and post 112 can be effected in the manner aforesaid, by an operative manipulation of screw 254.

The apparatus, in the various forms above described, is thus such that as the feeding belt intermittently moves forwardly, it deposits rows of bottles upon the stationary entrance portion of the transfer device. Thereafter, in timed sequence, the movable portion of the transfer mechanism, that is, the transfer grid, operatively transfers a full row of bottles from the entrance portion of the transfer mechanism to the exit portion thereof, at the same time pushing the most advanced row of bottles onto the adjacent discharging belt. And while this is being done, the transfer grid cooperates with the backing member to maintain the transfer bottles in proper aligned position, and held against tipping. In this way there is a continuous, rapid and effective flow of bottles from the end of a feeding belt to the discharge belt.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a conveyor mechanism, a feeding belt, a transfer apparatus and a discharge belt, the transfer apparatus being disposed between the said feeding and discharge belts for operatively transferring conveyed units from the former to the latter; said apparatus having a movable transfer section operatively movable between forward and rear limiting positions, and a platform having an exit portion disposed adjacent said discharge belt; the rear limiting position of the transfer section being adjacent said feeding belt, whereby units operatively conveyed by the latter will be deposited on said transfer section; the forward limiting position of said transfer section being in the region of said exit portion, whereby units operatively conveyed by the transfer section will be deposited on said exit portion of the platform, the transfer section being so proportioned that the front portion thereof is disposed at the receiving edge of said discharge belt when said section is at its said forward limiting position; the front portion of said transfer section being disposed above the level of said exit portion and movable thereacross during its operative forward movement, whereby said front portion will engage units operatively positioned on said exit portion to push them towards said discharge belt.

2. In a conveyor mechanism, a feeding belt, a transfer apparatus, a discharge belt and a movable backing member; the transfer apparatus being disposed between the said feeding and discharge belts for operatively transferring conveyed units from the former to the latter; said apparatus having a movable transfer section operatively movable between forward and rear limiting positions, and a platform having an exit portion disposed adjacent said discharge belt; the rear limiting position of the transfer section being adjacent said feeding belt, whereby units operatively conveyed by the latter will be deposited on said transfer section; the forward limiting position of said transfer section being in the region of said exit portion, whereby units operatively conveyed by the transfer section will be deposited on said exit portion of the platform, the transfer section being so proportioned that the front portion thereof is disposed at the receiving edge of said discharge belt when said section is at its said forward limiting position; the front portion of said transfer section being disposed above the level of said exit portion and movable thereacross during its operative forward movement, whereby said front portion will engage units operatively positioned on said exit portion to push them towards said discharge belt; said backing member being movable between rear and forward limiting positions, said backing member being disposed over said exit portion of the platform when the back member is in its said rear limiting position and over said discharge belt when it is in its said forward limiting position; and means to simultaneously move said transfer section and backing member forwardly; said backing member being spaced forwardly from the said front portion of the transfer section, whereby said units operatively engaged by said transfer section will be held between the front portion of said section and said backing member.

3. In a conveyor mechanism, a feeding belt, a transfer apparatus, a discharge belt and a stop bar above said transfer apparatus; the transfer apparatus being disposed between the said feeding and discharge belts for operatively transferring conveyed units from the former to the latter; said apparatus having a movable transfer section operatively movable between forward and rear limiting positions, and a platform having an exit portion disposed adjacent said discharge belt; actuating means to move said section forwardly between said limiting positions for an operative transferring movement and rearwardly between said positions for a return movement; the rear limiting position of the transfer section being adjacent said feeding belt, whereby units operatively conveyed by the latter will be deposited on said transfer section; the forward limiting position of said transfer section being in the region of said exit portion, whereby units operatively conveyed by the transfer section will be deposited on said exit portion of the platform, the transfer section being so proportioned that the front portion thereof is disposed at the receiving edge of said discharge belt when said section is at its said forward limiting position; the front portion of said transfer section being disposed above the level of said exit portion and movable thereacross during its operative forward movement, whereby said front portion will engage units operatively positioned on said exit portion to push them towards said discharge belt; said stop bar being disposed forwardly from the rear of said transfer section when the latter is in its said rear limiting position, said stop bar movable between upper and lower limiting positions, said bar when in its lower limiting position being in intercepting relation to the path of units operatively movable from said feeding belt to said transfer section, and being out of said path when in its said upper limiting position; and means to move said stop bar into said lower position during the operative return movement of said transfer section, and into said upper position during the operative forward movement of said section.

4. In a conveyor mechanism, a feeding belt, a transfer apparatus and a discharge belt, the transfer apparatus being disposed betwen the said feeding and discharge belts for operatively transferring conveyed units from the former to the latter; said apparatus having a movable transfer section operatively movable between forward and rear limiting positions, and a platform having an entrance portion disposed adjacent said feeding belt for receiving units operatively conveyed by the feeding belt, and an exit portion disposed adjacent said discharge belt; the rear limiting position of the transfer section being in the region of said entrance portion; the forward limiting position of said transfer section being in the region of said exit portion, whereby units operatively conveyed by the transfer section will be deposited on said exit portion of the platform, the transfer section being so proportioned that the front portion thereof is disposed at the receiving edge of said discharge belt when said section is at its said forward limiting position; actuating means to move said section forwardly between said limiting positions for an operative transferring movement and rearwardly between said positions for a return movement; said transfer section being movable to an upper level above that of said entrance and exit portions and movable thereacross at said upper level during its said forward transferring movement, whereby units from said entrance portion will be deposited upon said transfer section and carried toward said exit portion, the front portion of the transfer section engaging units operatively positioned on said exit portion to push them towards said discharge belt.

5. In a conveyor mechanism, a feeding belt, a transfer apparatus and a discharge belt, the transfer apparatus being disposed between the said feeding and discharge belts for operatively transferring conveyed units from the former to the latter; said apparatus having a movable transfer section operatively movable between forward and rear limiting positions, and a platform having an exit portion disposed adjacent said discharge belt; said exit portion constituting a discharge grid with a plurality of spaced parallel bars, said section constituting a transfer grid with a plurality of parallel bars proportioned and spaced for interpositioning between the bars of said discharge grid; the rear limiting position of the transfer grid being adjacent said feeding belt, whereby units operatively conveyed by the feeding belt will be deposited on said transfer grid; the forward limiting position of said transfer grid being in the region of said discharge grid with the bars of the transfer grid operatively disposed between those of the said discharge grid, whereby units operatively conveyed by the transfer grid will be deposited on said discharge grid, the transfer grid being so proportioned that the front portion thereof is disposed at the receiving edge of said discharge belt when said transfer grid is at its said forward limiting position; the front portion of said transfer grid being disposed above the level of said discharge grid and movable thereacross during its operative forward movement, whereby said front portion will engage units operatively positioned on said discharge grid to push them towards said discharge belt.

6. In a conveyor mechanism, a feeding belt, a transfer apparatus and a discharge belt, the transfer apparatus being disposed between the said feeding and discharge belts for operatively transferring conveyed units from the former to the latter; said apparatus having a movable transfer section operatively movable between forward and rear and between upper and lower limiting positions, and a platform having an exit portion disposed adjacent said discharge belt; actuating means to move said section forwardly between said limiting positions while it is in said upper position for an operative transferring movement, and rearwardly between said positions while the transfer section is in its said lower position for a return movement; the rear limiting position of the transfer section being adjacent said feeding belt, whereby units operatively conveyed by the latter will be deposited on said transfer section; the forward limiting position of said transfer section being in the region of said exit portion, whereby units operatively conveyed by the transfer section will be deposited on said exit portion of the platform, the transfer section being so proportioned that the front portion thereof is disposed at the receiving edge of said discharge belt when said section is at its said forward limiting position; the front portion of said transfer section being disposed above the level of said exit portion and movable thereacross during its operative forward movement, whereby said front portion will engage units operatively positioned on said exit portion to push them towards said discharge belt.

7. In a conveyor mechanism, a feeding belt, a transfer apparatus and a discharge belt, the transfer apparatus being disposed between the said feeding and discharge belts for operatively transferring conveyed units from the former to the latter; said apparatus having a movable transfer section operatively movable between forward and rear and between upper and lower limiting positions, and a platform having an exit portion disposed adjacent said discharge belt; said exit portion constituting a discharge grid with a plurality of spaced parallel bars, said section constituting a transfer grid with a plurality of parallel bars proportioned and spaced for interpositioning between the bars of said discharge grid; actuating means to move said transfer grid forwardly between said limiting positions while it is in said upper position for an operative transferring movement, and rearwardly between said positions while it is in its said lower position for a return movement; the rear limiting position of the transfer grid being adjacent said feeding belt, whereby units operatively conveyed by the feeding belt will be deposited on said transfer grid; the forward limiting position of said transfer grid being in the region of said discharge grid with the bars of the transfer grid operatively disposed between those of the said discharge grid, whereby units operatively conveyed by the transfer grid will be deposited on said discharge grid, the transfer grid being so proportioned that the front portion thereof is disposed at the receiving edge of said discharge belt when said transfer grid is at its said forward limiting position; the front portion of said transfer grid being disposed above the level of said discharge grid and movable thereacross during its operative forward movement, whereby said front portion will engage units operatively positioned on said discharge grid to push them towards said discharge belt.

8. In a conveyor mechanism, a feeding belt, a transfer apparatus and a discharge belt, the transfer apparatus being disposed between the said feeding and discharge belts for operatively transferring conveyed units from the former to the latter, said apparatus having a movable transfer section operatively movable between forward and rear and between upper and lower limiting positions, and a platform having an entrance portion disposed adjacent said feeding belt for receiving units operatively conveyed by the feeding belt, and an exit portion disposed adjacent said discharge belt; said entrance and exit portions constituting receiving and discharge grids, respectively, each of said grids comprising a plurality of spaced parallel bars, said section constituting a transfer grid with a plurality of parallel bars proportioned and spaced for interpositioning between the bars of said respective receiving and discharge grids; actuating means to move said transfer grid forwardly between said limiting positions while it is in said upper position for an operative transferring movement, and rearwardly between said positions while it is in its said lower position for a return movement; the rear limiting position of the transfer grid being adjacent said feeding belt with the bars of the transfer grid operatively disposed between those of said receiving grid, whereby units operatively disposed on said receiving grid will be deposited on said transfer grid when it is operatively raised to its said upper position; the forward limiting position of said transfer grid being in the region of said discharge grid with the bars of the transfer grid operatively disposed between those of the said discharge grid, whereby units operatively conveyed by the transfer grid will be deposited on said discharge grid, the transfer grid being so proportioned that the front portion thereof is disposed at the receiving edge of said discharge belt when said transfer grid is at its said forward limiting position; the front portion of said transfer grid being disposed above the level of said discharge grid and movable thereacross during its operative forward movement, whereby said front portion will engage units operatively positioned on said discharge grid to push them towards said discharge belt.

9. In a conveyor mechanism, the combination according to claim 5, the said front portion of the said transfer grid comprising lips extending upwardly from the forward ends of the bars of the transfer grid, said lips being in transverse alignment.

10. In a conveyor mechanism, the combination according to claim 1, and intermittent driving means for said feeding belt, said driving means actuating said feeding belt forwardly during the operative rearward movement of said transfer section between said limiting positions, said feeding belt being stationary during the operative forward movement of said transfer section between said limiting positions.

11. In a conveyor mechanism, the combination according to claim 6, and intermittent driving means for said feeding belt, said feeding belt being operatively movable forwardly when the transfer section is in its said lower limiting position, and being stationary when the transfer section is in its said upper limiting position.

12. In a conveyor mechanism, a feeding belt, a transfer apparatus, a discharge belt, a movable backing member, and a stop bar above said transfer apparatus; the transfer apparatus being disposed between the said feeding and discharge belts for operatively transferring conveyed units from the former to the latter; said apparatus having a movable transfer section operatively movable between forward and rear limiting positions, and a platform having an exit portion disposed adjacent said discharge belt; actuating means to move said section forwardly between said limiting positions for an operative transferring movement and rearwardly between said positions for a return movement; the rear limiting position of the transfer section being adjacent said feeding belt, whereby units operatively conveyed by the latter will be deposited on said transfer section; the forward limiting position of said transfer section being in the region of said exit portion, whereby units operatively conveyed by the transfer section will be deposited on said exit portion of the platform, the transfer section being so proportioned that the front portion thereof is disposed at the receiving edge of said discharge belt when said section is at its said forward limiting position; the front portion of said transfer section being disposed above the level of said exit portion and movable thereacross during its operative forward movement, whereby said front portion will engage units operatively postioned on said exit portion to push them towards said discharge belt; said backing member being disposed forwardly from the rear of said transfer section when the latter is in its said rear limiting position, said stop bar movable between rear and forward limiting positions, said backing member being disposed over said exit portion of the platform when the backing member is in its said rear limiting position and over said discharge belt when it is in its said forward limiting position; and means to simultaneously move said transfer section and backing member forwardly; said backing member being spaced forwardly from the said front portion of the transfer section, whereby said units operatively engaged by said transfer section will be held between the front portion of said section and said backing member; said stop bar being movable between upper and lower limiting positions, said bar when in its lower limiting position being in intercepting relation to the path of units operatively movable from said feeding belt to said transfer section, and being out of said path when in its said upper limiting position; and means to move said stop bar into said lower position during the operative forward movement of said section.

13. In a conveyor mechanism, a feeding belt, a discharge belt, a transfer apparatus disposed between said feeding and discharge belts for operatively transferring conveyed units from the former to the latter, said apparatus having a movable transfer section operatively movable between forward and rear limiting positions, actuating means for operatively moving said section between said limiting positions, a backing member movable between retracted and forward limiting positions and spaced forwardly from the front portion of said transfer section, and backing member actuating means, said actuating means for the transfer section having cam means supporting said transfer section, a cam shaft connected to said cam means, the cam means and cam shaft being movable between said forward and rear limiting positions, and driving means connected with said cam means for operatively moving said cam means and cam shaft between the said forward and rear limiting positions, whereby said transfer section is operatively moved between said limiting positions; said backing member actuating means having a bearing bracket supported by said cam shaft, a backing member shaft extending through and supported by said bearing bracket and connected to said backing member, whereby said backing member shaft and the backing member will move forwardly to its forward limiting position during the operative forward movement of the cam shaft and transfer section; a stationary spring anchorage disposed rearwardly of said backing member, a spring attached to said anchorage and to said backing member, whereby it will resist the said forward movement of the backing member during the forward operative movement of said cam shaft and associated parts, and will yieldably urge said backing member towards its said retracted limiting position, a transverse bar fixedly secured to said backing member shaft, a pawl releasably engageable with said bar when the backing member shaft is at its forward position, whereby the backing member is held in its said forward limiting position against the action of said spring, and means to release said pawl from its engagement with said transverse bar, to permit the backing member to return to its said retracted limiting position under the action of said spring.

14. In a conveyor mechanism, a feeding belt, a transfer apparatus, a discharge belt, a stop bar above said transfer apparatus, a vertical stop bar post, a bracket mounted over and slidably movable on said post, a vertically movable lever pivotally connected to said bracket, actuating means for the lever, said bar being pivotally connected to said bracket and being rockably movable between forward and rear limiting positions, and rocking means for operatively actuating said bar between its said limiting positions; the transfer apparatus being disposed between the said feeding and discharge belts for operatively transferring conveyed units from the former to the latter; said apparatus having a movable transfer section operatively movable between forward and rear limiting positions; actuating means to move said section forwardly between said limiting positions for an operative transferring movement and rearwardly between said positions for a return movement; the rear limiting position of the transfer section being adjacent said feeding belt, whereby units operatively conveyed by the latter will be deposited on said transfer section; said stop bar being movable between upper and lower limiting positions, said bar when in its lower limiting position being in intercepting relation to the path of units operatively movable from said feeding belt to said transfer section, and being out of said path when in its said upper limiting position; said rocking means comprising a pin extending from said bracket, a support for said bar rotatably mounted over said pin, a spur gear fixedly secured to said support, two spaced arms on said lever and straddling said pin and engageable with diametrically opposite portions thereof, the distance between said arms being greater than the diameter of said pin, and a gear rack mounted on said lever and in engagement with said spur gear.

15. In a conveyor mechanism, a feeding belt, a transfer apparatus, a discharge belt, a stop bar above said transfer apparatus, a vertical stop bar post, a bracket mounted over and slidably movable on said post, a vertically movable lever pivotally connected to said bracket, actuating means for the lever, said bar being pivotally connected to said bracket and being rockably movable between forward and rear limiting positions, and rocking means for operatively actuating said bar between its said limiting positions; the transfer apparatus being disposed between the said feeding and discharge belts for operatively transferring conveyed units from the former to the latter; said apparatus having a movable transfer section operatively movable between forward and rear limiting positions; actuating means to move said section forwardly between said limiting positions for an operative transferring movement and rearwardly between said positions for a return movement; the rear limiting position of the transfer section being adjacent said feeding belt, whereby units operatively conveyed by the latter will be deposited on said transfer section; said stop bar being movable between upper and lower limiting positions, said bar when in its lower limiting position being in intercepting relation to the path of units operatively movable from said feeding belt to said transfer section, and being out of said path when in its said upper limiting position; said rocking means comprising a support for said bar rotatably mounted on said bracket, a rocker arm secured to said support, said lever being pivotally connected to said arm, said bracket having two opposite stop members in vertically spaced relation, an actuator pin associated with said rocker arm and disposed between said stop members and alternately engageable therewith during the operative movement of said rocker arm, the movement of said actuator pin between said stop members being determinative of the movement of the stop bar between its said forward and rear limiting positions.

16. In a conveyor mechanism, a feeding belt, a transfer apparatus, a discharge belt, a stop bar above said transfer apparatus, a vertical stop bar post, a bracket mounted over and slidably movable on said post, a vertically movable lever pivotally connected to said bracket, actuating means for the lever, said bar being pivotally connected to said bracket and being rockably movable between forward and rear limiting positions, and rocking means for operatively actuating said bar between its said limiting positions; the transfer apparatus being disposed between the said feeding and discharge belts for operatively transferring conveyed units from the former to the latter; said apparatus having a movable transfer section operatively movable between forward and rear limiting positions; actuating means to move said section forwardly between said limiting positions for an operative transferring movement and rearwardly between said positions for a return movement; the rear limiting position of the transfer section being adjacent said feeding belt, whereby units operatively conveyed by the latter will be deposited on said transfer section; said stop bar being movable between upper and lower limiting positions, said bar when in its lower limiting position being in intercepting relation to the path of units operatively movable from said feeding belt to said transfer section, and being out of said path when in its said upper limiting position; said rocking means comprising a support for said bar rotatably mounted on said bracket, a rocker arm secured to said support, said lever being pivotally connected to said arm, said bracket having two opposite vertically adjustable stop members in vertically spaced relation, an actuator pin associated with said rocker arm and disposed between said stop members and alternately engageable therewith during the operative movement of said rocker arm, the adjusted distance between said stop members being determinative of the movement of the stop bar between its said forward and rear limiting positions.

17. In a conveyor mechanism, a feeding belt, a transfer apparatus, a discharge belt, a stop bar above said transfer apparatus, a vertical stop bar post, a bracket mounted over and slidably movable on said post, a vertically movable lever pivotally connected to said bracket, actuating means for the lever, said bar being pivotally connected to said bracket and being rockably movable between forward and rear limiting positions, and rocking means for operatively actuating said bar between its said limiting positions; the transfer apparatus being disposed between the said feeding and discharge belts for operatively transferring conveyed units from the former to the latter; said apparatus having a movable transfer section operatively movable between forward and rear limiting positions; actuating means to move said section forwardly between said limiting positions for an operative transferring movement and rearwardly between said positions for a return movement; the rear limiting position of the transfer section being adjacent said feeding belt, whereby units operatively conveyed by the latter will be deposited on said transfer section; said stop bar being movable between upper and lower limiting positions, said bar when in its lower limiting position being in intercepting relation to the path of units operatively movable from said feeding belt to said transfer section, and being out of said path when in its said upper limiting position; said rocking means comprising a support for said bar rotatably mounted on said bracket, a rocker arm secured to said support, said lever being pivotally connected to said arm, said bracket having two opposite stop members in vertically spaced relation, an actuator pin associated with said rocker arm and disposed between said stop members and alternately engageable therewith during the operative movement of said rocker arm, the movement of said actuator pin between said stop members being determinative of the movement of the stop bar between its said forward and rear limiting positions; and yieldable means carried by said bracket and in slidable engagement with said post, whereby the operative slidable movement of said bracket will be frictionally resisted by said yieldable means.

18. In a conveyor mechanism, the combination according to claim 12, said stop bar and backing member being in spaced parallel relation and extending in the direction of said discharge belt.

References Cited in the file of this patent

UNITED STATES PATENTS

| | | |
|---|---|---|
| 1,451,216 | Gruetter | Apr. 10, 1923 |
| 1,715,204 | Lorenz | May 28, 1929 |
| 1,832,344 | Wittman | Nov. 17, 1931 |
| 2,026,172 | Holm | Dec. 31, 1935 |
| 2,184,915 | Gray | Dec. 26, 1939 |
| 2,292,800 | Rose | Aug. 11, 1942 |
| 2,587,959 | Biner | Mar. 4, 1952 |
| 2,621,774 | Rourke | Dec. 16, 1952 |